M. AND H. JACOBSTEIN.
CIGAR PACKAGE.
APPLICATION FILED APR. 26, 1915.
1,358,956.
Patented Nov. 16, 1920.
4 SHEETS—SHEET 1.
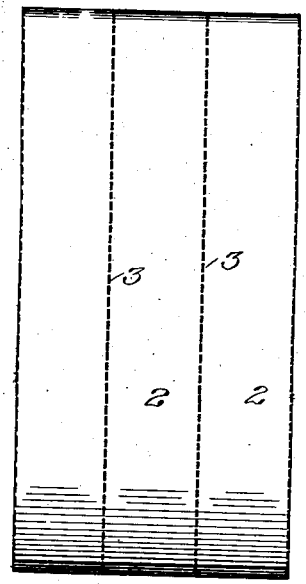
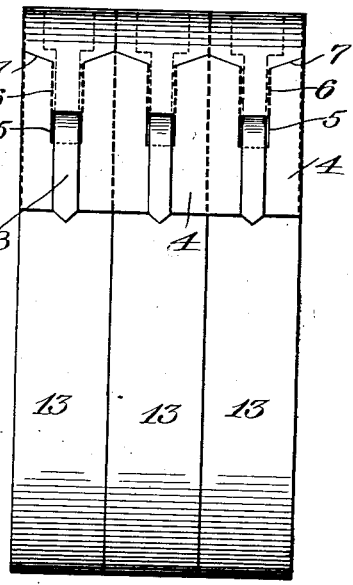
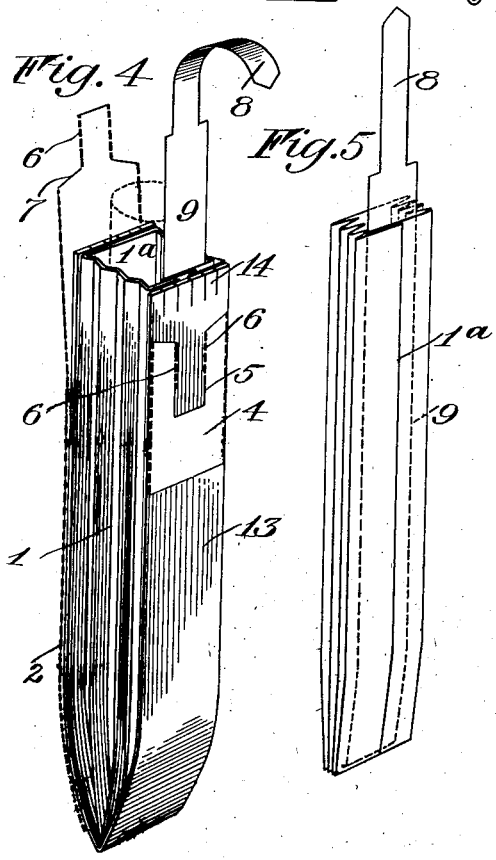
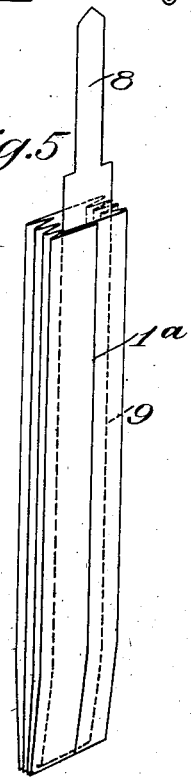
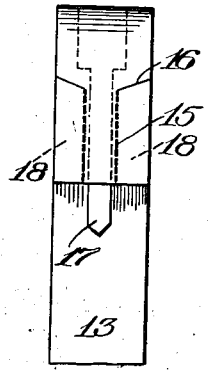
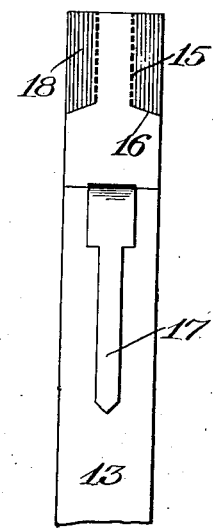
INVENTORS
Meyer Jacobstein
Hyman Jacobstein
BY
their ATTORNEYS

M. AND H. JACOBSTEIN.
CIGAR PACKAGE.
APPLICATION FILED APR. 26, 1915.

1,358,956.

Patented Nov. 16, 1920.
4 SHEETS—SHEET 2.

INVENTORS
Meyer Jacobstein
Hyman Jacobstein
BY
Church & Rich
their ATTORNEYS

M. AND H. JACOBSTEIN.
CIGAR PACKAGE.
APPLICATION FILED APR. 26, 1915.

1,358,956.

Patented Nov. 16, 1920.
4 SHEETS—SHEET 3.

INVENTORS
Meyer Jacobstein
Hyman Jacobstein
BY
Church Rich
their ATTORNEYS

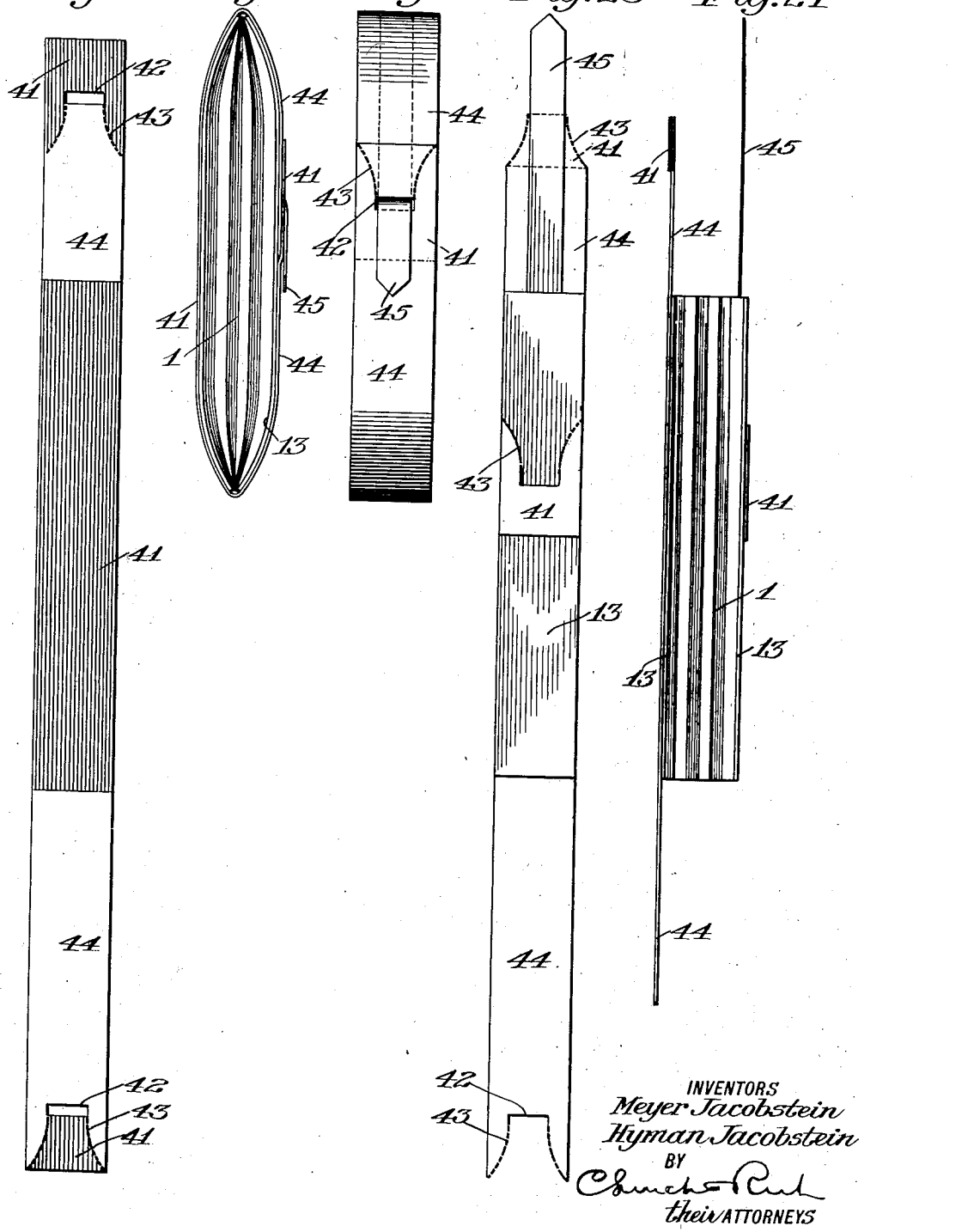

UNITED STATES PATENT OFFICE.

MEYER JACOBSTEIN AND HYMAN JACOBSTEIN, OF ROCHESTER, NEW YORK.

CIGAR-PACKAGE.

1,358,956.

Specification of Letters Patent.

Patented Nov. 16, 1920.

Application filed April 26, 1915. Serial No. 23,805.

*To all whom it may concern:*

Be it known that we, MEYER JACOBSTEIN and HYMAN JACOBSTEIN, of Rochester, in the county of Monroe and State of New York, have invented certain new and useful Improvements in Cigar-Packages; and we do hereby declare the following to be a full, clear, and exact description of the same, reference being had to the accompanying drawings, forming a part of this specification, and to the reference numerals marked thereon.

The invention has for its purpose to provide a cigar package which will protect the contents securely, preventing handling or breakage, and also serving to preserve, more or less, the original state of the tobacco by effecting a substantial seal which obviates ready access of air to the interior of the package. A further object of the invention is to afford a construction that can be made of card or paper board with provision for permitting ready removal of an article from its package. The invention contemplates also a structure that requires breaking a seal before a cigar can be removed, the parts being combined in such a way that the operation which breaks the package also serves to partially eject the cigar, thus overcoming the difficulty usually experienced in removing cigars from paper containers. To these and other ends the invention consists in certain improvements and combinations of parts, all as will be hereinafter more fully described, the novel features being pointed out in the claims at the end of the specification.

In the drawings:

Figure 1 is a view in elevation illustrating a preferred embodiment of the invention;

Fig. 2 is a side view of the same;

Fig. 3 is a front elevation;

Fig. 4 is a perspective view of a single cell, showing the position of the parts after the seal has been broken, and the cigar partially ejected;

Fig. 5 is a perspective view of the inner cell, or wax paper lining, and ejecting device, with the sealing means omitted;

Fig. 6 is a front elevation, showing a slightly modified form, with the covering sealed;

Fig. 7 is a similar view of the parts before sealing the cover;

Fig. 21 is a side elevation of a modified form of the invention;

Fig. 22 is a front view of the same;

Fig. 23 is a front view showing the covering device before it is sealed;

Fig. 24 is a side view of the parts after the seal is broken, and

Fig. 25 is a plan view of the blank constituting the covering device of Figs. 21 to 24 inclusive.

Similar reference numerals in the several figures indicate corresponding parts.

The invention is susceptible of a number of different applications, as indicated from the several forms disclosed in the present case, and we have endeavored to illustrate the typical embodiment of the improvements, which consist essentially in constructing a cigar package equipped with a covering to go over an end or ends of the package and adapted to be brought into sealed engagement in such a way that the seal can be broken by a pull exerted on a projecting or exposed portion carried by the package. The seal breaking means is preferably correlated with a cigar ejecting device so as to partially eject a cigar from the package at the same time that the seal is broken, although the seal breaking means may be otherwise constructed, and it is within the province of the invention to form it as part of the sealing covering itself. Having in mind the functions generally set forth above, the following description will afford an understanding of several practical methods of carrying the improvement into effect, although it will be understood that the invention may be otherwise applied and is not limited to the particular forms shown or described.

Figure 8:
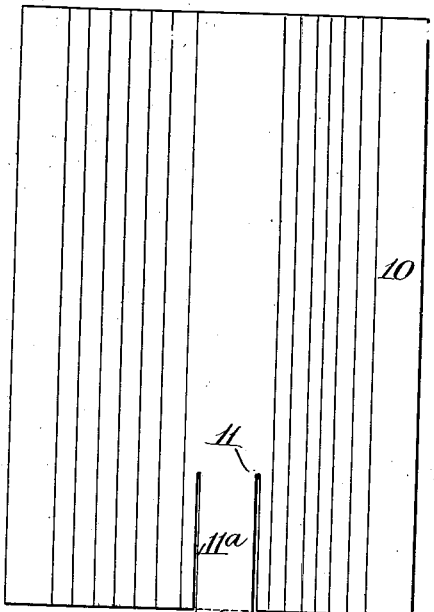
Fig. 8 is a plan view of the blank from which the inner lining or cell, and ejecting device, is formed.

Figs. 1 to 5 inclusive and 8 illustrate a convenient and efficient application of the invention in which 1 designates an outer cell formed of paper or otherwise, as usual in this class of devices, while 1ª is an inner cell or lining, preferably formed of wax paper or the like. 13 is a backing, preferably of cardboard or like material having a stiffening character, which is attached to each outer cell or lining 1, serving to make the structure rigid and to prevent injury to the contents of the package. Attached to the backing 13 is a sealing or protective covering, designated by 2, and preferably formed of paper. The covering 2 embodies a sheet extending over a series of cells and attached to each of them, together with means for enabling any one or more cells or packages to be detached, and consisting in the present instance of lines of perforations 3 along which the covering may be detached, each section thereof carrying its corresponding cell. Each section of the covering 2 is extended beyond the top of the cell to afford a portion 4 which may be brought over the top and attached to the front of the backing 13 by means of glue or other adhesive medium. The covering 2 can thus be brought into sealed engagement with each cell, as shown in Figs. 1 to 3, and in order to release the covering and break the seal, means are provided carried by the package and adapted to project beyond the body of the covering so as to sever the latter when pulled. To this end the covering is preferably provided with openings 5, one for each section of the covering, while 6 designates lines of perforations extending longitudinally of the covering from the opening 5, and terminating in cuts or slits 7, which connect the lines of perforations with the edges of the covering and are preferably arranged at the angle shown. The portion of the covering which lies above the slits 7 is free from glue or other attaching means so that when it is severed, as shown in Fig. 4, it can be raised to expose the interior of the package. The seal breaking means comprises a tongue or portion 8 which projects through the opening 5 in the manner shown in Fig. 3, and is preferably connected with an ejecting means so that it can be operated to eject a cigar simultaneously with the severing of the covering. This can be accomplished by employing an inner lining or cell made from a blank such as shown in Fig. 8, which is provided with a cigar engaging strip 9 preferably formed integral with the blank 10 and connected thereto at a point 11 in spaced relation to an end of the blank, the cigar engaging strip being separated from the body of the blank by slits 11ª which may be as shown or in the form of perforations. The strip 9 is bent upwardly on the line 12 when the cell or lining is formed, its upper end extending beyond the adjacent end of the cell and permitting tongue 8 to pass through opening 5. With this construction, the strip 9 normally assumes the position shown in Fig. 5, and when the package is sealed the tongue 8 is brought down to the position shown in Figs. 2 and 3. Initial upward pull on the tongue 8 severs the covering along the lines of perforations 6, thus releasing the covering, while further pull exerted on the tongue 8 causes the engaging strip to be elevated, as shown in Fig. 4, lifting the cigar correspondingly and partially ejecting it from the package. The backing 13 is provided with cuts 14 at the ends thereof in order to produce a certain degree of resiliency at this portion of the backing, whereby the article is fully protected within the cell and the latter is possessed of sufficient stiffness and rigidity to prevent injury from the ordinary sources, and to permit ready insertion and removal of a cigar without breaking the wrapper. It will be understood, however, that the backing 13 in the form shown is not an essential part of the invention, since it may be desirable in some cases to utilize a sealing covering or an ejecting means, or both, in conjunction with a cell that does not employ such a backing.

In Figs. 6 and 7 the structure is modified by omitting the opening 5 and permitting the lines of perforations 15 to extend from the angular slits 16 to the end of the covering, while the tongue 17 is long enough to permit it to project beyond the end of the covering. The latter is provided with portions 18 to which glue is applied and by which it is sealed to the cell in the manner shown in Fig. 6. When the tongue 17 is pulled upwardly the seal is broken along the lines of perforations 15, releasing the top of the covering.

Figure 9:
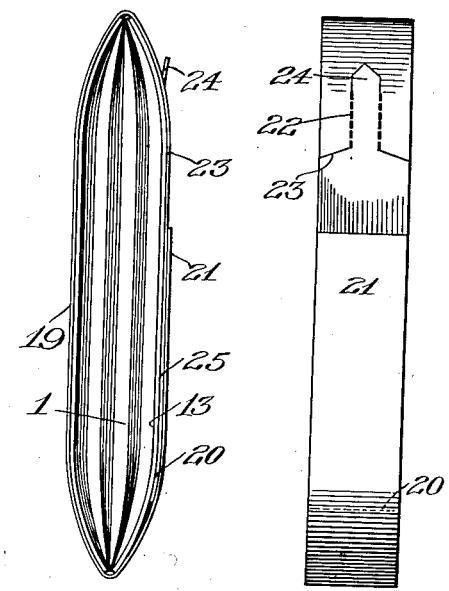
Fig. 9 is a side view of a modification.
Figure 10:
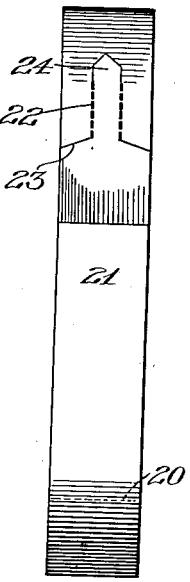
Fig. 10 is a front elevation thereof.
Figure 11:
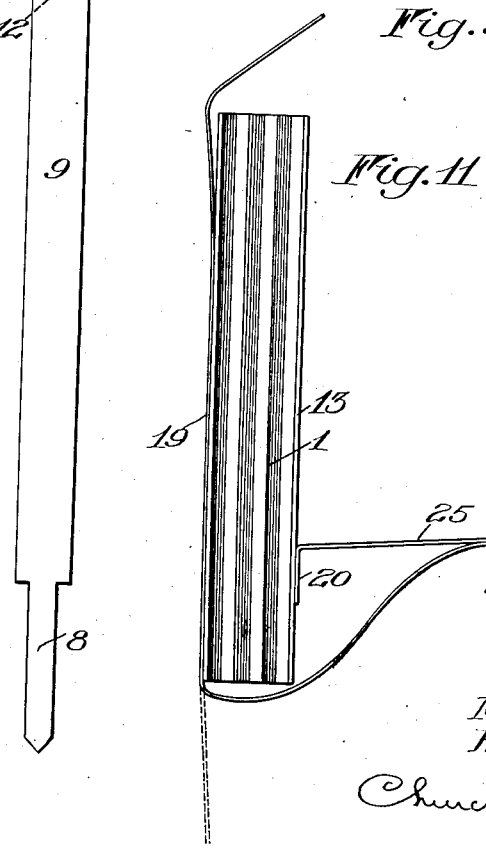
Fig. 11 is a side view showing the position of the parts illustrated in the two previous views, after the seal is broken.

In the form shown in Figs. 9 to 11 inclusive, the strip or covering 19 extends entirely around the cell, one end being secured to the front of the cell at 20 while the opposite end overlaps the end 20 and is attached at 21. The strip 19 is provided with lines of perforations 22 connecting with angular cuts or slits 23, while 24 is a loose end of a tab or tongue struck out from the strip and adapted to be pulled when the seal is to be broken. Pulling on the tongue 24 severs the strip along the lines of perforations 22, releasing the upper portion as shown in Fig. 11, while a downward and outward pull of the tongue 24 stretches the portion 25, expanding and separating the walls of the cell, and finally tearing the portions 25 away from the backing 13, thus exposing both ends of the cell and permitting the cigar to be readily removed.

Figure 12:
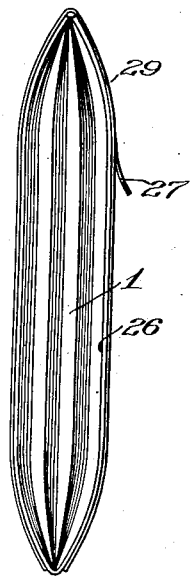
Fig. 12 is a side view of another form of the construction.
Figure 13:
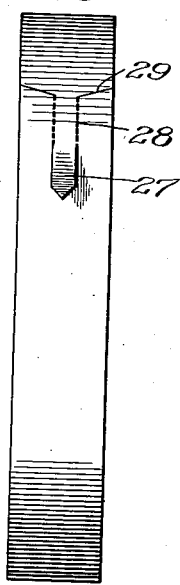
Fig. 13 is a front elevation of the same.
Figure 14:
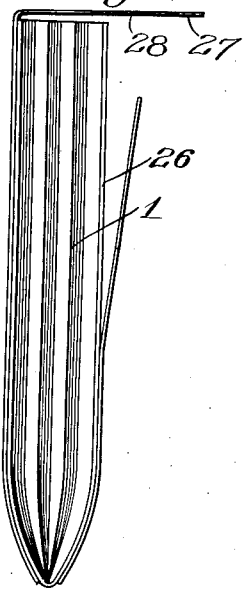
Fig. 14 is a side view with the seal broken.
Figure 20:
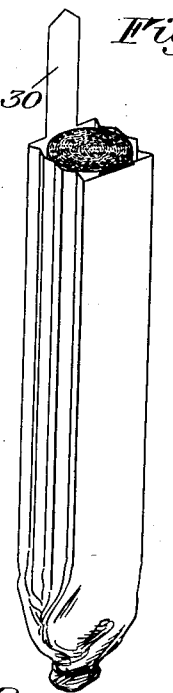
Fig. 20 is a perspective view of another form of lining or cell.
Figure 15:
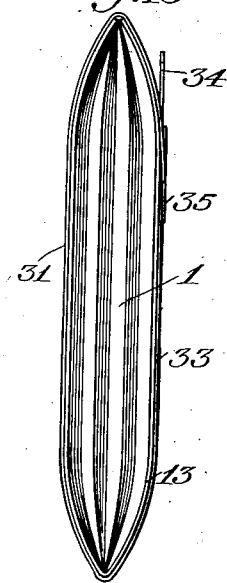
Fig. 15 is a side elevation, showing a further modification of the invention.
Figure 16:
Fig. 16 is a front elevation of the parts appearing in Fig. 15.
Figure 17:
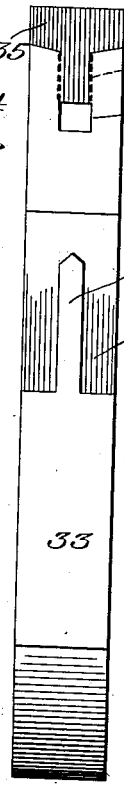
Fig. 17 is a front elevation, showing the covering device before it is sealed.
Figure 18:
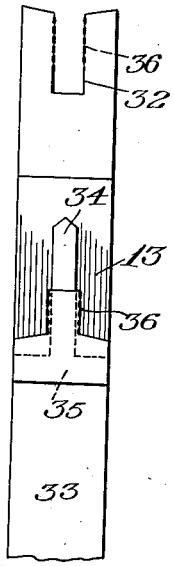
Fig. 18 is a similar view after the seal is broken.

Figs. 12 to 14 inclusive show a modification in which the sealing covering does not extend entirely around the cell, the latter being protected by a backing 26 passing around one end thereof. The covering incloses the opposite end of the cell and carries a free tongue or tab 27 connecting with the lines of perforations 28 which extend to the transverse cuts 29. By pulling on the tongue 27 the upper part of the covering is released, as shown in Fig. 14. With this, as well as the other forms of the structure herein described, we may employ an inner lining or cell, such as shown in Fig. 20 which may be inserted within the outer cell and carries an upwardly extending tongue or tab 30 by which it can readily be removed from the package without breaking or injuring the cigar. The tongue 30 is preferably long enough to extend through the opening provided in the sealing covering, which is severed or broken when the tongue 30 is pulled.

Figure 19:
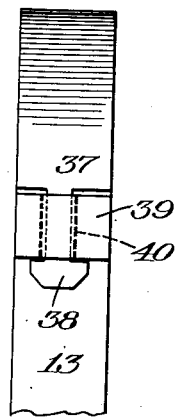
Fig. 19 is a front elevation of another modification.

Figs. 15 to 18 inclusive disclose a further form of the invention where the strip or sealing covering 31 is provided with an opening 32, and attached to the strip 31 is a portion 33 which may be formed separate if desired and secured to the front backing of the cell. The portion 33 carries a tongue 34 which may be passed through the opening 32. 35 designates the glued portion of the strip by which it is sealed, and when the tongue 34 is pulled, the upper part of the covering is released after it is severed along the lines of perforations 36. Fig. 19 shows a further modification in which the covering 37 carries a free end portion or tongue 38 that is held in place by a strip 39 which may be glued or sealed on to the package and is provided with lines of perforations 40, along which it is severed when the tongue 38 is pulled.

Figs. 21 to 25 disclose another modification where the sealing strip or covering passes entirely around the package with its ends overlapping. 41 designates the sealing portions of the strip to which glue is applied. 42 are slots or openings, while 43 are curved lines of perforations connecting the openings 42 with the edges of the strip, and 44 are the unglued portions which are released when the seal is broken. With this structure, we employ a tongue 45 independently of the sealing strip and suitably attached to the package either by being carried by the inner lining or cell or in some other convenient manner. When the package is sealed the ends of the strip are overlapped, bringing the openings 42 into coincident relation, and the tongue 45 is passed therethrough, as shown in Figs. 21 and 22. Upon pulling the tongue 45 both ends of the sealing strip are released, and the interior of the package is exposed at either end in the manner shown in Figs. 23 and 24. It will be apparent of course that we may also employ an ejecting means, such as already described, in connection with the form of the invention which has just been described.

We claim as our invention:

1. A cigar package comprising inner and outer cells, a covering extending over an end thereof and having a part thereof sealed to the outer cell, and a cigar engaging strip on the inner cell for breaking the covering and ejecting the contents of the package.

2. A cigar package comprising a cell, a covering closing the cell and having a portion constructed to facilitate severance and removal of the covering, and means including a part formed to normally project through the covering and to coöperate with the severable portion thereof for breaking the latter and exposing the contents of the cell.

3. A cigar package comprising a plurality of cells, a covering joining the cells and closing each thereof and provided with means for readily separating the cells, said covering having also for each cell a portion constructed to facilitate severance and removal of the covering from the end of the cell, and means including a part formed to normally project through the covering and to coöperate with the severable portion thereof for breaking the latter and exposing the contents of the cell.

4. A cigar package comprising a cell, a backing for stiffening the latter, a covering closing the cell and having a portion constructed to facilitate severance and removal of the covering, and means including a part formed to normally project through the covering and to coöperate with the severable portion thereof for breaking the latter and exposing the contents of the cell.

5. A cigar package comprising a cell, a covering closing the cell and having a portion constructed to facilitate severance and removal of the covering and means for ejecting the contents of the cell, including a part formed to normally project through the covering and to coöperate with the severable portion thereof for breaking the latter and exposing the contents of the cell.

MEYER JACOBSTEIN.
HYMAN JACOBSTEIN.

Witnesses:
H. E. STONEBRAKER,
RUSSELL B. GRIFFITH.